(12) United States Patent
Cheng et al.

(10) Patent No.: US 7,669,063 B2
(45) Date of Patent: Feb. 23, 2010

(54) METHOD OF POWER DOWN CONTROL FOR A DISPLAY DEVICE, AND POWER DOWN CONTROLLER FOR IMPLEMENTING THE METHOD

(75) Inventors: Bin Cheng, Taipei Hsien (TW); Tao Chang, Taipei Hsien (TW); Ye Liu, Taipei Hsien (TW); Jian Song, Taipei Hsien (TW); Jiandong Wang, Taipei Hsien (TW); Bingru Dou, Taipei Hsien (TW)

(73) Assignee: Top Victory Electronics (Taiwan) Co., Ltd., Taipei Hsien (TW)

( * ) Notice: Subject to any disclaimer, the term of this patent is extended or adjusted under 35 U.S.C. 154(b) by 581 days.

(21) Appl. No.: 11/424,319

(22) Filed: Jun. 15, 2006

(65) Prior Publication Data

US 2007/0294545 A1    Dec. 20, 2007

(51) Int. Cl.
*G06F 1/00* (2006.01)
*H04N 5/63* (2006.01)

(52) U.S. Cl. .......................... 713/300; 713/310; 348/730
(58) Field of Classification Search .................. 713/300, 713/310; 348/730
See application file for complete search history.

(56) References Cited

U.S. PATENT DOCUMENTS

| | | | |
|---|---|---|---|
| 5,523,781 A * | 6/1996 | Brusaw | 725/151 |
| 5,715,465 A * | 2/1998 | Savage et al. | 713/340 |
| 5,962,930 A * | 10/1999 | Cluff et al. | 307/66 |
| 6,052,793 A * | 4/2000 | Mermelstein | 713/340 |
| 6,178,513 B1 * | 1/2001 | Lee | 713/300 |
| 6,285,406 B1 * | 9/2001 | Brusky | 348/552 |
| 6,330,175 B2 * | 12/2001 | Shirato et al. | 363/89 |
| 6,618,813 B1 * | 9/2003 | Hsu et al. | 713/323 |
| 6,915,440 B2 * | 7/2005 | Berglund et al. | 713/340 |
| 6,968,465 B2 * | 11/2005 | Freevol et al. | 713/300 |
| 7,116,889 B2 * | 10/2006 | Kweon | 386/46 |

\* cited by examiner

*Primary Examiner*—Ji H Bae
(74) *Attorney, Agent, or Firm*—Darby & Darby P.C.

(57) ABSTRACT

A method of power down control (PDC) for a display device is to be implemented by a processor in a power down controller of the display device. The power down controller includes a main system, a main system power source, and a PDC power source. The method includes the steps of: (A) receiving power from the PDC power source, determining if the main system is to be activated, and proceeding to step (B) if affirmative; (B) turning on the main system power source, and activating the main system; (C) determining if operation in a power down mode is intended, and proceeding to step (D) if affirmative; and (D) turning off the main system power source to operate in the power down mode. Further, a state parameter is stored that allows the main system to be restored to the operating state prior to a power interruption.

15 Claims, 4 Drawing Sheets

METHOD OF POWER DOWN CONTROL FOR A DISPLAY DEVICE, AND POWER DOWN CONTROLLER FOR IMPLEMENTING THE METHOD

BACKGROUND OF THE INVENTION

1. Field of the Invention

The invention relates to power control of electronic devices, more particularly to a method of power down control for a display device, and to a power down controller for implementing the method.

2. Description of the Related Art

Electronic products that are operable in a power down mode to reduce unnecessary power consumption are known in the art. However, there are many display devices, such as plasma display panel (PDP) television sets, that have high power consuming components and that do not support operation in the power down mode.

SUMMARY OF THE INVENTION

Therefore, the main object of the present invention is to provide a method of power down control for a display device that can minimize unnecessary power consumption.

Another object of the present invention is to provide a power down controller for a display device to implement the method of this invention.

According to one aspect of the present invention, there is provided a method of power down control (PDC) for a display device. The method is to be implemented by a processor in a power down controller of the display device. The power down controller includes a main system, a main system power source, and a PDC power source. The method comprises the steps of:

(A) receiving power from the PDC power source, determining if the main system is to be activated, and proceeding to step (B) if affirmative;

(B) turning on the main system power source, and activating the main system;

(C) determining if operation in a power down mode is intended, and proceeding to step (D) if affirmative; and (D) turning off the main system power source to operate in the power down mode.

According to another aspect of the present invention, there is provided a power down controller for a display device. The power down controller comprises a main system, a main system power source for supplying power to the main system, a power down control (PDC) power source, and a PDC module.

The PDC module includes a memory unit for storing a state parameter associated with an operating state of the main system, and a processor coupled to the main system, the main system power source, the PDC power source and the memory unit. According to an aspect of the present invention, the state parameter allows the main system to be restored to the operating state prior to a power interruption.

The processor receives power from the PDC power source, inspects the state parameter stored in the memory unit, turns on the main system power source and activates the main system with reference to the state parameter inspected thereby, determines if operation in a power down mode is intended, and turns off the main system power source if operation in the power down mode is intended.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
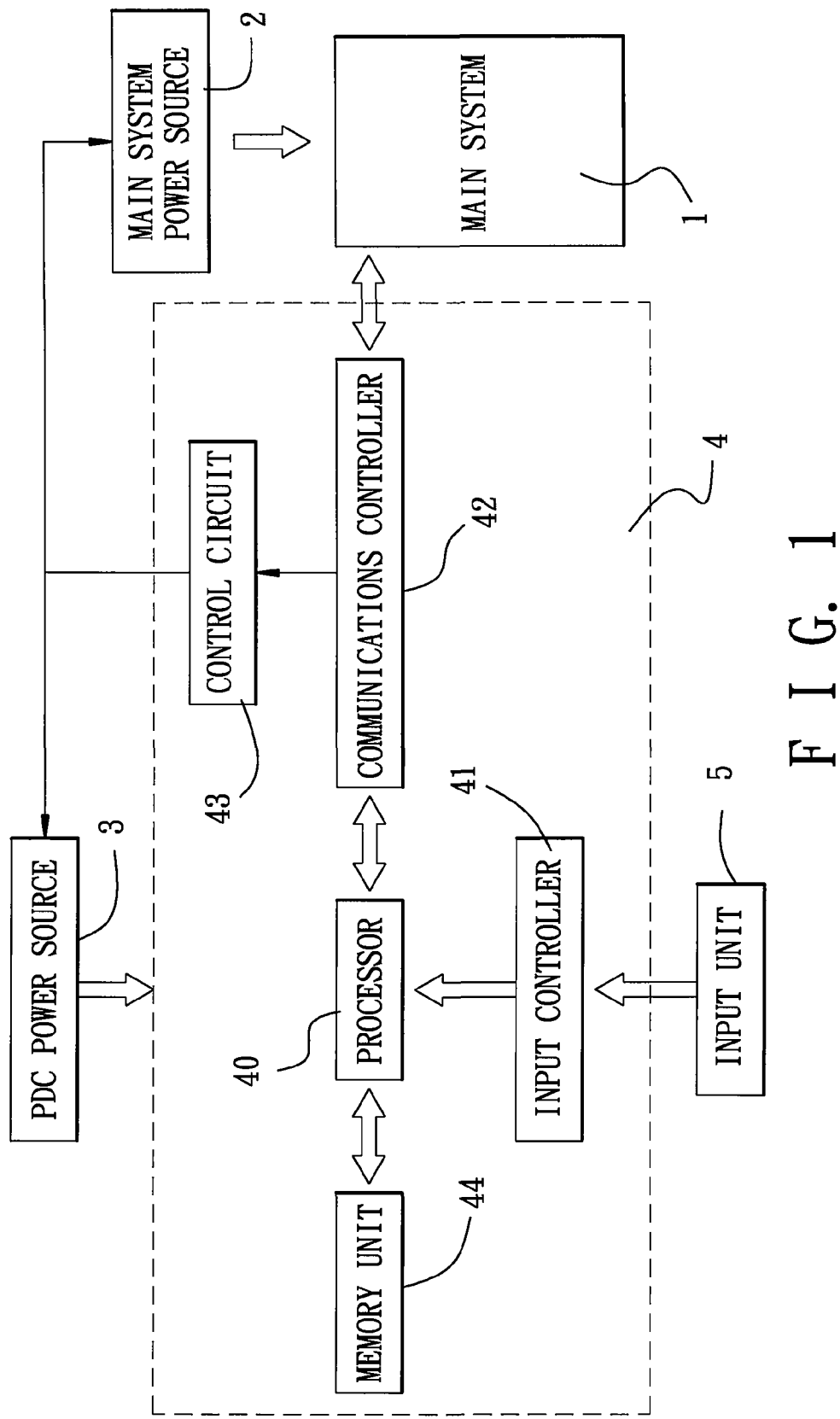
FIG. 1 is a schematic circuit block diagram of the preferred embodiment of a power down controller according to the present invention.

Referring to FIG. 1, the preferred embodiment of a power down controller for a display device, such as a plasma display panel television or a liquid crystal display television, according to the present invention is shown to comprise a main system 1, a main system power source 2 for supplying power to the main system 1, a power down control (abbreviated as PDC hereinafter) power source 3, a PDC module 4, and an input unit 5.

The PDC module 4 includes a memory unit 44 (such as an EEPROM or a flash memory) for storing a state parameter associated with an operating state of the main system 1, and a processor 40 (such as a micro-controller unit (MCU)) coupled to the main system 1, the main system power source 2, the PDC power source 3 and the memory unit 44. The processor 40 has firmware stored therein for executing the method of power down control of this invention. The PDC module 4 further includes a communications controller 42 coupled between the main system 1 and the processor 40 for handling communication of commands therebetween, an input controller 41 coupled between the input unit 5 and the processor 40 for handling input commands from the input unit 5, and a control circuit 43 that couples the communications controller 42 to the PDC power source 3 and the main system power source 2 so that activation and deactivation of the main system power source 2 can be controlled through the control circuit 43. In practice, the input unit 5 can be a keyboard, a remote controller, etc. Input commands entered by the user through the input unit 5 are received by the input controller 41 and are subsequently provided to the processor 40.

Figure 2:
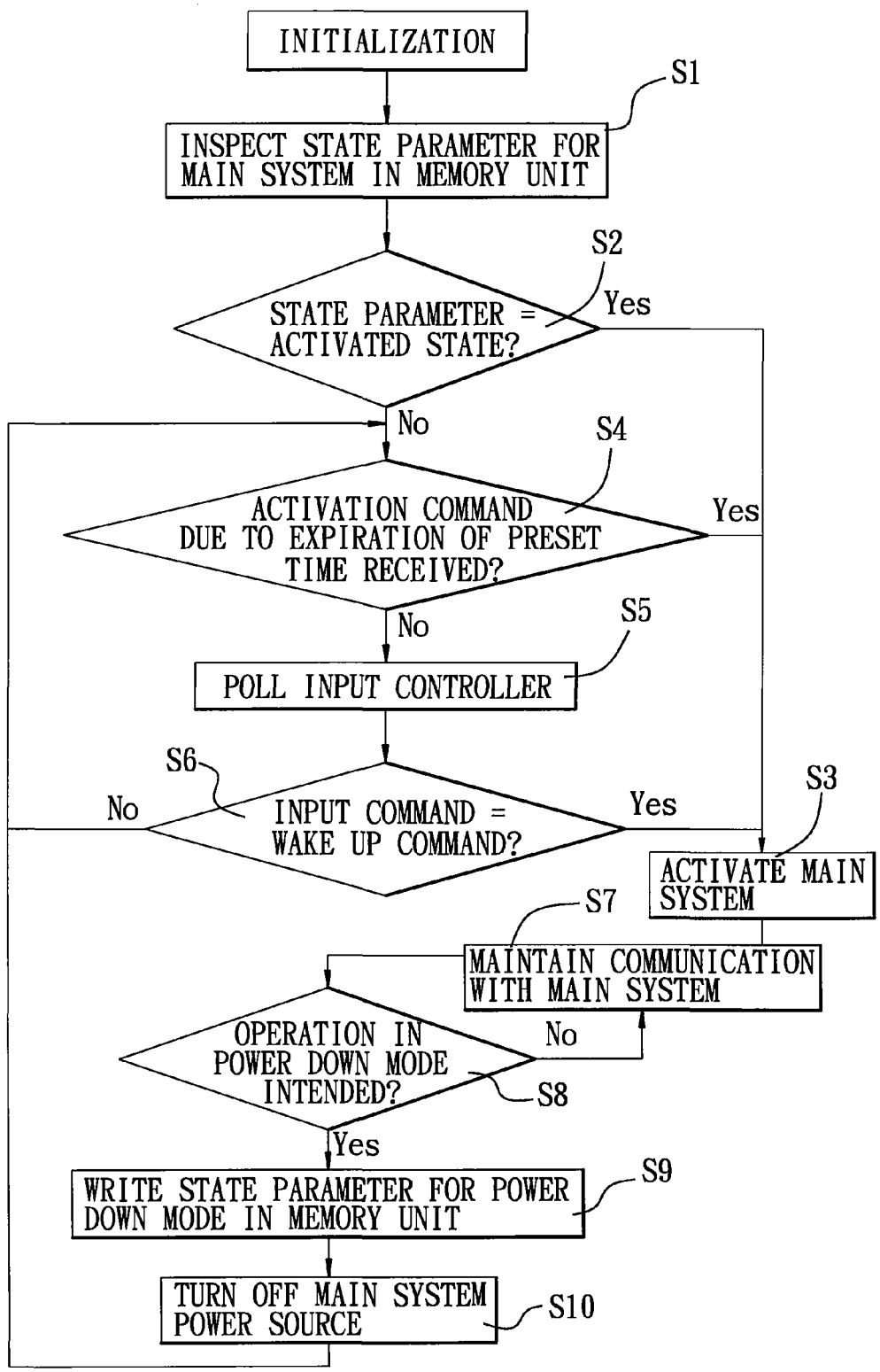
FIG. 2 is a flowchart of the preferred embodiment of a method of power down control according to the present invention.

FIG. 2 illustrates the preferred embodiment of a method of power down control (PDC) executed by the processor 40 of the PDC module 4 of the power down controller.

First, upon system initialization, the processor 40 receives power from the PDC power source 3, and inspects the state parameter for the main system 1 as stored in the memory unit 44 (step S1).

Next, the processor 40 determines if the main system 1 is to be activated with reference to the state parameter inspected thereby (step S2). That is, if the inspected state parameter corresponds to an activated state of the main system 1, the flow goes to step S3. Otherwise, the flow goes to step S4.

In step S4, the processor 40 determines if an activation command due to expiration of a preset time was received. In the affirmative, the flow goes to step S3. Otherwise, the flow goes to step S5.

As an example, if the processor 40 determined that the main system 1 is not to be activated in step S2, which indicates that the main system 1 may be operating in the power down mode, and if the processor 40 receives the activation command through the communications controller 42 upon expiration of the preset time, the processor 40 will notify the control circuit 43 through the communications controller 42 to turn on the main system power source 2 so that power is supplied to the main system 1, thereby activating the main system 1.

On the other hand, if it was determined in step S4 that the activation command due to expiration of the preset time was not received by the processor 40, the flow proceeds to step S5, in which the processor 40 polls the input controller 41, and then to step S6, in which the processor 40 inspects the polled result to determine if a wake up command entered by the user via the input unit 5 was received by the input controller 41. In the affirmative, the flow goes to step S3. Otherwise, the flow goes back to step S4 to repeat steps S4 to S6.

Figure 4:
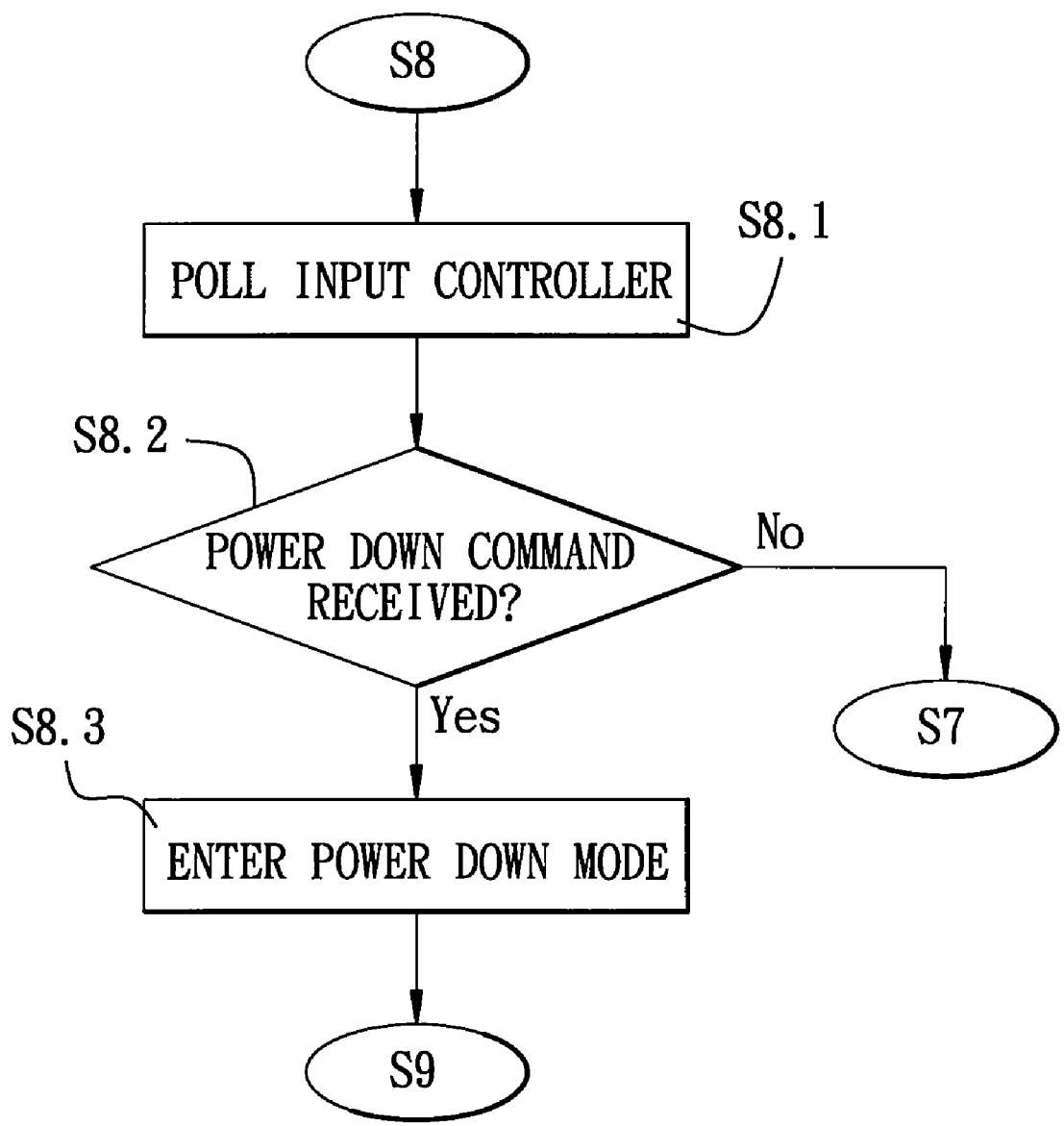
FIG. 4 is a flowchart illustrating sub-steps for entering in a power down mode in the flowchart of FIG. 2.

After step S3 is performed, the main system 1 operates in the activated state, and the flow then proceeds to step S7, in which the processor 40 maintains communication with the main system 1 through the communications controller 42. Then, in step S8, it is determined if operation in the power down mode is intended. The sub-steps associated with step S8 are illustrated in FIG. 4. In sub-step S8.1, the input controller 41 is polled. Then, in sub-step S8.2, it is determined if a power down command entered by the user via the input unit 5 was received by the input controller 41. If the power down command was not received, the flow goes back to step S7. Otherwise, the flow proceeds to sub-step S8.3 to enter in the power down mode, and then to step S9, where the state parameter corresponding to operation of the main system 1 in the power down mode is written into the memory unit 44.

Referring once again to FIG. 2, after step S9, the flow proceeds to step S10, in which the main system power source 2 is turned off to shut down the main system 1. While the PDC power source 3 is still turned on during operation in the power down mode, since it is not required for the PDC power source 3 to supply power to the main system 1, its output power is much smaller than that of the main system power source 2.

After step S10, the flow goes back to step S4 to repeat steps S4 to S10 in order to permit switching of the main system 1 between the power down and activated modes.

Figure 3:
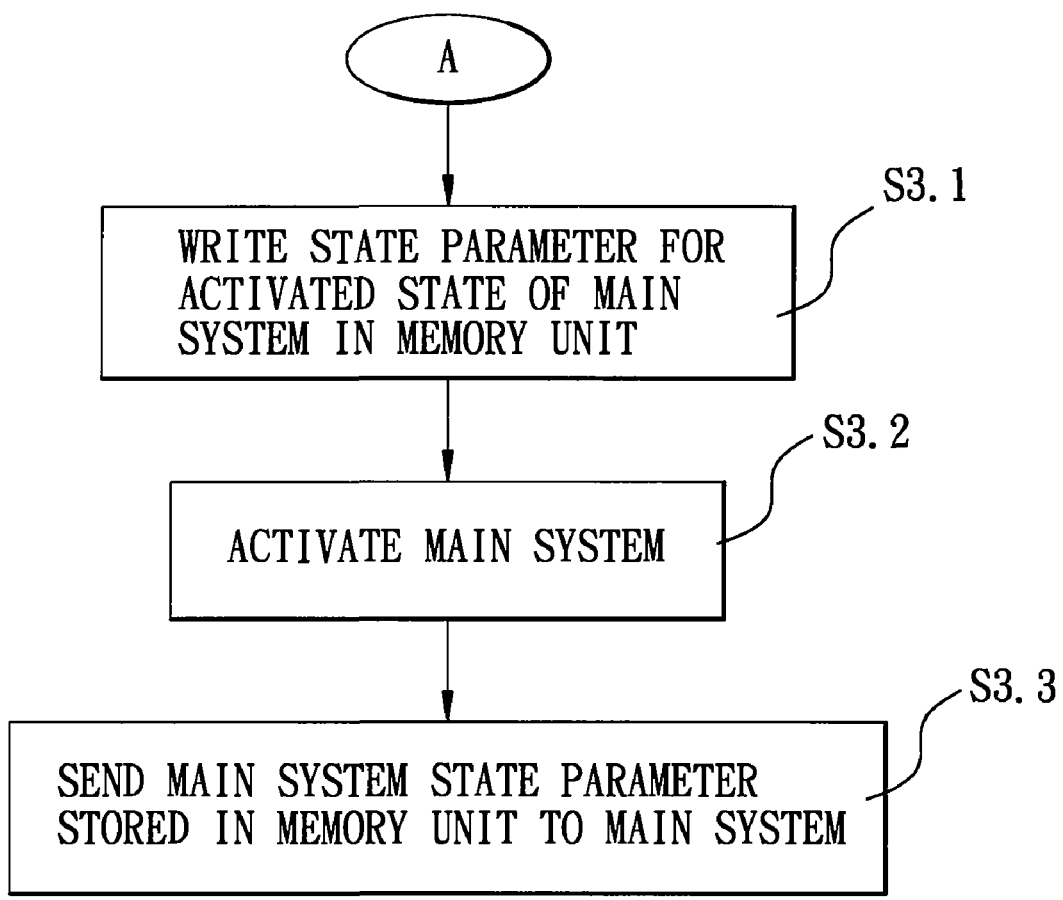
FIG. 3 is a flowchart illustrating sub-steps for activating a main system in the flowchart of FIG. 2.

The sub-steps associated with step S3 are illustrated in FIG. 3. In sub-step S3.1, the processor 40 writes into the memory unit 44 the state parameter corresponding to the activated state of the main system 1. Then, in sub-step S3.2, the main system 1 is activated. Finally, in sub-step S3.3, the state parameter written into the memory unit 44 is transmitted to the main system 1 through the communications controller 42.

In case the entire system is shut down due to power interruption, upon resumption of power, the PDC module 4 will be activated first. Upon reactivation of the PDC module 4, the state parameter in the memory unit 44 is inspected to determine the previous operating state of the main system 1 before deciding whether the main system 1 is to be activated. As a result, the main system 1 can be restored to the same state prior to the power interruption.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of power down control (PDC) for a television, the method to be implemented by a processor in a power down controller of the television, the power down controller receiving power from a PDC power source and including a memory unit, the television further including a main system that receives power from a main system power source, the processor having firmware stored therein for executing the method, the method comprising the steps of:

upon resumption of power after the main system is shut down due to power interruption, inspecting a state parameter that is stored in the memory unit of the power down controller, and that is associated with a previous operating state of the main system at the time power was interrupted;

determining whether the main system is to be activated with reference to the inspected state parameter; and turning on the main system power source to activate the main system to the previous operating state when it is determined that the inspected state parameter indicates that the previous operating state of the main system at the time power was interrupted is an activated state.

2. The method of claim 1, further comprising the steps of:

determining whether a preset time has expired when it is determined that the inspected state parameter indicates that the previous operating state of the main system at the time power was interrupted is a power down state; and turning on the main system power source to activate the main system when it is determined that the preset time has expired.

3. The method of claim 2, further comprising the steps of:

determining if a wake up command was received when it is determined that the preset time has not yet expired;

turning on the main system power source to activate the main system when it is determined that the wake up command was received; and proceeding back to the step of determining whether a preset time has expired when it is determined that the wake up command was not received.

4. The method of claim 3, further comprising the step of writing into the memory unit the state parameter corresponding to the activated state of the main system before turning on the main system power source.

5. The method of claim 3, further comprising the steps of:

determining if a power down command was received after the main system power source is turned on;

writing into the memory unit the state parameter corresponding to operation of the main system in a power down mode when it is determined that the power down command was received;

turning off the main system power source to enable the main system to operate in a power down mode; and proceeding back to the step of determining whether a preset time has expired.

6. A power down controller for a television that includes a main system power source, a power down control (PDC) power source, and a main system receiving power from the main system power source, the power down controller receiving power from the PDC power source, the power down controller comprising:

a memory unit for storing a state parameter associated with an operating state of the main system; and a processor having firmware stored therein and being adapted to be coupled to the main system and the main system power source, and coupled to the memory unit;

wherein, upon resumption of power after the main system is shut down due to power interruption, the processor is configured to execute the firmware to inspect the state parameter stored in the memory unit and associated with a previous operating state of the main system at the time power was interrupted, determine whether the main system is to be activated with reference to the state parameter inspected thereby, and turn on the main system power source to activate the main system to the previous operating state when it is determined that the state parameter inspected thereby indicates that the previous operating state of the main system at the time power was interrupted is an activated state.

7. The power down controller of claim 6, wherein the processor is further configured to execute the firmware to determine whether a preset time has expired when it is determined that the state parameter inspected thereby indicates that the previous operating state of the main system at the time power was interrupted is a power down state, and to turn on the main system power source to activate the main system when it is determined that the preset time has expired.

8. The power down controller of claim 6, further comprising a communications controller for coupling the processor to the main system and handling communication therebetween.

9. The power down controller of claim 6, the television further including an input unit, wherein the power down controller further comprises an input controller for coupling the processor to the input unit and for transmitting a wake up command from the input unit to the processor;

the processor being further configured to execute the firmware to determine if the wake up command was received while the main system is not activated, write into the memory unit the state parameter corresponding to the activated state of the main system when it is determined that the wake up command was received, and turn on the main system power source to activate the main system in response to the wake up command.

10. The power down controller of claim 6, the television further including an input unit, wherein the power down controller further comprises an input controller for coupling the processor to the input unit and for transmitting a power down command from the input unit to the processor;

the processor being further configured to execute the firmware to determine if the power down command was received while the main system is activated, write into the memory unit the state parameter corresponding to operation of the main system in a power down mode when it is determined that the power down command was received, and turn off the main system power source to enable the main system to operate in the power down mode in response to the power down command.

11. A television comprising:
a main system power source;
a main system receiving power from the main system power source;
a power down control (PDC) power source; and
a power down controller receiving power from the PDC power source, the power down controller including a memory unit for storing a state parameter associated with an operating state of the main system, and a processor having firmware stored therein coupled to the main system, the main system power source, and the memory unit;

wherein, upon resumption of power after the main system is shut down due to power interruption, the processor is configured to execute the firmware to inspect the state parameter stored in the memory unit and associated with a previous operating state of the main system at the time power was interrupted, determine whether the main system is to be activated with reference to the state parameter inspected thereby, and turn on the main system power source to activate the main system to the previous operating state when it is determined that the state parameter inspected thereby indicates that the previous operating state of the main system at the time power was interrupted is an activated state.

12. The television of claim 11, wherein the processor is further configured to execute the firmware to determine whether a preset time has expired when it is determined that the state parameter inspected thereby indicates that the previous operating state of the main system at the time power was interrupted is a power down state, and to turn on the main system power source to activate the main system when it is determined that the preset time has expired.

13. The television of claim 11, further comprising a communications controller for coupling the processor to the main system and handling communication therebetween.

14. The television of claim 11, further comprising an input unit, the power down controller further including an input controller for coupling the processor to the input unit and for transmitting a wake up command from the input unit to the processor;

the processor being further configured to execute the firmware to determine if the wake up command was received while the main system is not activated, write into the memory unit the state parameter corresponding to the activated state of the main system when it is determined that the wake up command was received, and turn on the main system power source to activate the main system in response to the wake up command.

15. The television of claim 11, further comprising an input unit, the power down controller further including an input controller for coupling the processor to the input unit and for transmitting a power down command from the input unit to the processor;

the processor being further configured to execute the firmware to determine if the power down command was received while the main system is activated, write into the memory unit the state parameter corresponding to operation of the main system in a power down mode when it is determined that the power down command was received, and turn off the main system power source to enable the main system to operate in the power down mode in response to the power down command.

* * * * *